April 26, 1960
W. H. LAMAN
2,934,753
MOVEMENT DETECTION DEVICE
Filed Dec. 20, 1957
2 Sheets-Sheet 1
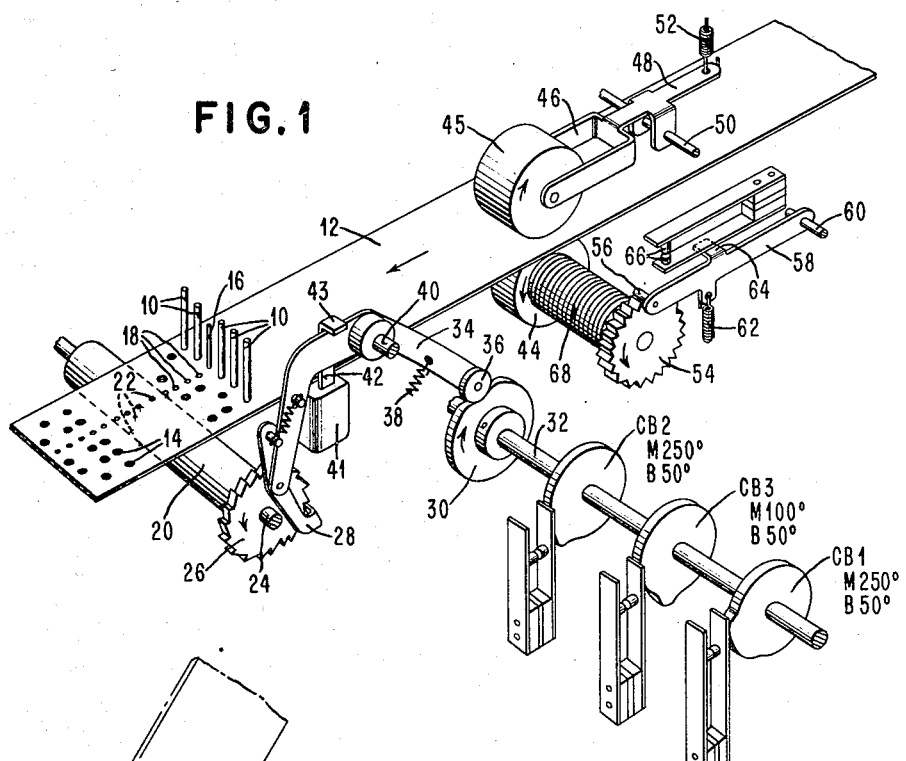
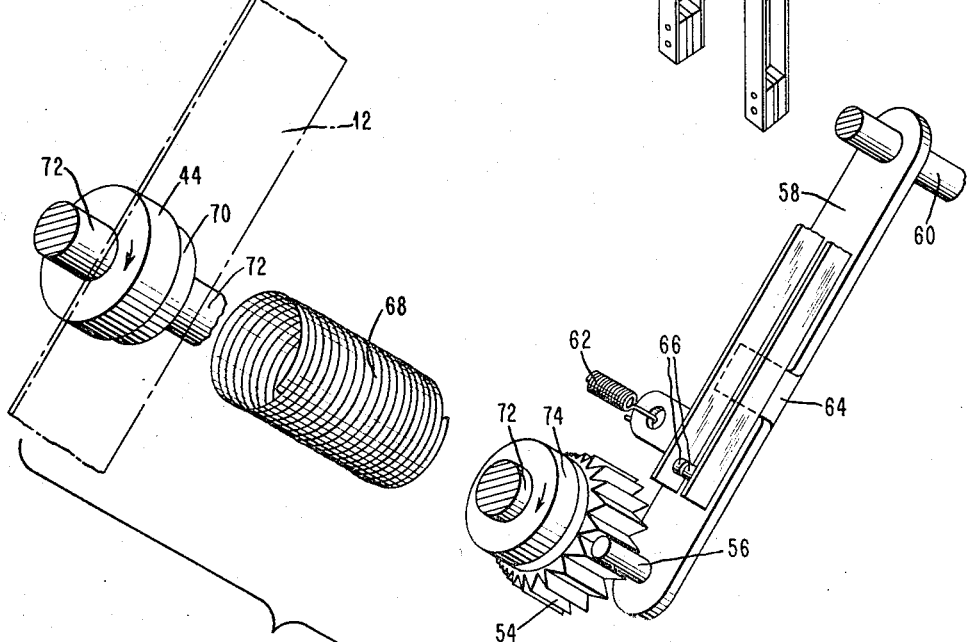
INVENTOR.
WILLIAM H. LAMAN
BY
*Murray Nanes*
ATTORNEY United States Patent Office 2,934,753
Patented Apr. 26, 1960

2,934,753
MOVEMENT DETECTION DEVICE

William H. Laman, Wappingers Falls, N.Y., assignor to International Business Machines Corporation, New York, N.Y., a corporation of New York Application December 20, 1957, Serial No. 704,090

1 Claim. (Cl. 340—259)

This invention relates to intermittent feeding devices and more particularly to attachments to intermittently fed record machines that operate to detect and indicate failures of the records to feed.

Previous devices have operated in a manner to indicate failure to feed after a predetermined number of operations of the record advancing means, or after a predetermined time after the last operation of the record advancing means.

It is an object of this invention to provide an improved attachment for a record feed machine which operates to detect and indicate a failure of the record to feed when the record advancing means is operated.

Another object of the invention is to provide a means for indicating a failure of the record to feed for a single operation of the record advancing means.

Still another object of the invention is to provide a means which is operated by the movement of the record once and only once for each operation of the record advancing means.

A further object of the invention is to provide a pair of contacts which are operated, once and only once, by each movement of the record.

A still further object is to provide a synchronizing means which operates to rotate a ratchet wheel under control of the record a predetermined distance for each movement of the tape.

Another object of the invention is to provide an improved device, for indicating the failure of a record to feed, which is simple in construction, inexpensive to manufacture, and reliable in operation.

Other objects of the invention will be pointed out in the following description and claim and illustrated in the accompanying drawings, which disclose by way of example, the principle of the invention and the best mode, which has been contemplated, of applying that principle.

In the drawings:

Fig. 1 is a diagrammatic illustration of the mechanical components of a preferred embodiment of the invention.

Fig. 2 is an exploded isometric view of part of Fig. 1 showing a tape follower mechanism and tape movement check contacts actuated thereby.

Figure 3:
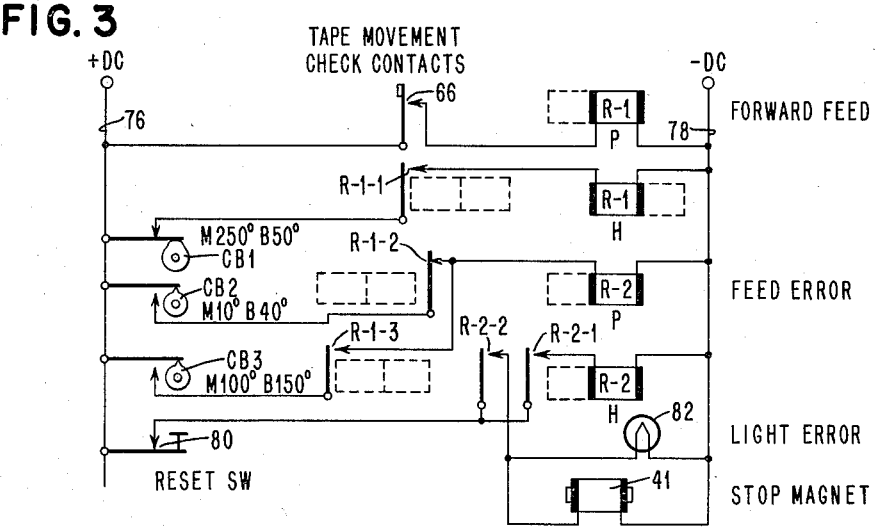
Fig. 3 illustrates the circuits which detect whether the tape movement check contacts are actuated and which indicates an error if they are not actuated.

In present day calculators, perforated tape machines are utilized as one of a plurality of means for transferring information into and out of the calculator. The tapes are perforated in accordance with coded signals which may come from punched cards or other sources. Since definite spacing of the coded perforations in the tape is necessary, the tape is normally intermittently fed by a rotating tape feed wheel engaging a row of feed holes. Sometimes because of ripped feed holes or other reasons, the tape will not be properly advanced even though the tape feed wheel is rotated, leading to error which must be detected. In the present invention the moving tape operates to actuate a pair of contacts for each intermittent operation of the tape, and a test is made as to whether the contacts have been actuated. Failure of the contacts to actuate may mean failure of the tape to move.

Referring first to Fig. 1, the preferred embodiment of the invention is shown as a paper tape punch, only such parts of the punch being shown as are thought necessary for a complete understanding of the invention. A series of punch pins 10 are adapted to be selectively operated in accordance with received signals to perforate coded holes 14 in the tape 12. One of the pins 16 is adapted to be operated, on each perforating operation, to produce feed holes 18 in the tape 12. Adapted to cooperate with the feed holes 18 is a feed wheel 20 which has a row of radially extending pins 22 normally engaged with the feed holes 18. The feed wheel 20 is fixed to a shaft 24 for rotation therewith, and also fixed to the shaft 24 is a ratchet wheel 26. Cooperating with the ratchet wheel 26 is a pawl 28 which is adapted to be operated once for each perforating operation. As shown, the pawl 28 is adapted to be operated by a cam 30 fixed to a rotating shaft 32. Each revolution of the shaft 32 and the cam 30 causes one column feed of the tape 12 by utilizing a tape feed arm 34. The tape feed arm 34 is equipped with a cam follower 36 which engages cam 30. When the low dwell portion of the cam 30 engages cam follower 36, a spring 38 pulls feed arm 34 clockwise about its support pivot 40 thereby permitting feed pawl 28 to engage ratchet 26 and drive it counterclockwise to feed the tape 12 one column. In the embodiment illustrated, the tape is standard paper tape and the distance between center lines of the tape columns is one tenth of an inch.

If it is desired to prevent further movement of the feed wheel 20 when there has been a failure of tape movement, a stop magnet 41 is utilized. The stop magnet 41 is mounted adjacent the tape feed arm 34 and is equipped with an armature 42, including a bent over portion 43 which locks over the tape feed arm 34. Upon the energization of the stop magnet 41, the armature 42 will be moved into position to hold tape feed arm 34 away from its cam 30.

Preferably located so as to contact the tape 12 before the punch pins 10 and 16 do, is a tape movement friction roller 44. The tape 12 passes over the roller 44 and is frictionally held in engagement therewith by a pressure roller 45 supported by a yoke 46 and a lever 48. The lever 48 is urged counterclockwise about a pivot 50 by the action of a spring 52 to press the pressure roller 45 into the tape 12 and against the friction roller 44. Thus the friction roller 44 will rotate an angular distance solely determined by the one-tenth of an inch linear travel of the tape 12.

The intermittent rotational movement of the friction roller 44 causes a similar rotational movement of ratchet wheel 54 having high and low dwells around its circumference in a manner to be presently described. A detent roller 56 is adapted to cooperate with the high and low dwells of the ratchet wheel 54. Detent roller 56 is rotationally mounted on an arm 58 which is pivoted at its other end, on a shaft 60. A spring 62, connected to arm 58, acts to urge the arm in a counterclockwise direction so that the detent roller 56 normally rests in a low dwell of the ratchet wheel 56.

Each rotational movement of the ratchet wheel 54 will cause the detent roller 56 to ride from its low dwell over a high dwell to the next low dwell of ratchet wheel 54. Each time that the detent roller 56 rides over a high dwell on the ratchet wheel 54, a lip 64 on the arm 58 acts to close a pair of normally open tape movement check contacts 66. The return to the next low dwell allows the contacts 66 to reopen. Thus the purpose of the structure operated by the movement of the tape 12 is to actuate the tape movement check contacts 66 by first closing and then opening them.

As will be presently shown, to make the device operate properly, the tape movement check contacts 66 must close at the same time in each cycle, a full cycle being the time from the operation of one tape column until the same time in the operation at the next tape column. If the roller 44 and the ratchet wheel 54 were tied together it would be practically impossible for each movement of the tape to move the detent roller 56 from the center of one low dwell to the exact center of the next low dwell. Then if the spring 62 were not very strong, it would be possible for the detent roller 56, at the completion of a series of tape movement cycles, not to be centered in the low dwell of the ratchet wheel 54. In other words, the friction roller 44 would tend to either overthrow or underthrow the detent roller 56 in relation to the ratchet wheel 54 dwell and the condition would exaggerate itself dwell by dwell. This overthrow or underthrow would in turn have a direct bearing on the position in the cycle during which the contacts should close, and the device would not operate properly. This out of step condition is eliminated by the use of a coil spring 68 which operates, in a manner to be described in conjunction with Fig. 2, to allow the detent roller 56 and the normally open tape movement check contacts 66 to synchronize themselves after each tape movement cycle.

Instead of the overthrow or underthrow condition, if the spring 62 were made strong enough to move the ratchet wheel 54 by moving the detent roller 56 into the low dwell, the motion would be transmitted back to the friction roller 44 to cause a buckling of the tape 12 and erratic spacing between columns.

The friction roller 44 which has a hub portion 70 (Fig. 2) rotates freely on a shaft 72. The ratchet wheel 54 also has a hub portion 74 having the same diameter as the hub portion 70. The inside diameter of the coil spring 68 is such that it tightly fits around the hubs 70 and 74. Therefore, any rotational motion in a forward direction by the roller 44 (clockwise in Fig. 2) will produce a tightening of the spring 68 because of the interaction between the hub 70 and the inside of the spring 68. This tightening effect starts almost as soon as the hub 70 of the roller 44 is rotated, and the other end of coil spring 68 therefore acts on hub 74 to rotate the ratchet wheel 54 in the same direction as roller 44. The distance between the low dwells on the ratchet wheel 54 is made greater than the one-tenth of an inch between columns so that coil spring 68 will not rotate the ratchet wheel far enough to move the detent roller 56 the complete way from one low dwell to the next. However, spring 62 acts to force detent roller 56 into the low dwell of ratchet wheel 54, by rotating ratchet wheel 54 a little further, even after the roller 44 has stopped moving. This continued rotation of hub 74 (clockwise in Fig. 2) has the effect of producing a loosening of coil spring 68 so as not to retransmit any motion to the friction wheel 44. Thus, there is a movement of the detent roller 56 from low dwell to low dwell for each movement of the tape from column to column.

The circuit shown in Fig. 3 is adapted to indicate whether the tape movement check contacts 66 have been actuated; failure of actuation meaning failure of the tape 12 to move. Since it is possible that the tape movement check contacts 66 might stick together in the closed position and thus never indicate failure of the tape to move, the circuit of Fig. 3 is designed so that it will indicate an error if the contacts 66 fail to open or close once for each tape movement.

Figure 4:
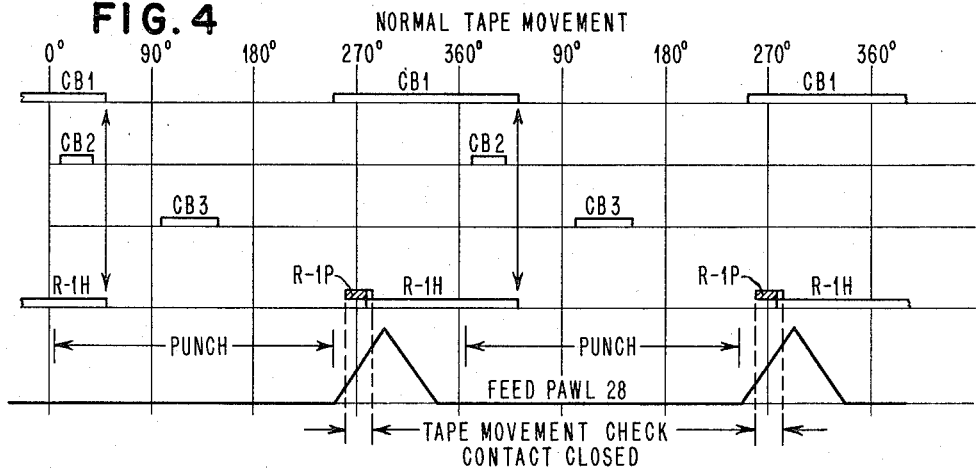
Fig. 4 is a timing chart showing the operation of the cams and contacts of Fig. 1 during normal tape movement.

Before going into the details of the circuit of Fig. 3, a discussion of the basic timing for the paper tape punch, as the preferred embodiment of the invention, will be given. Fig. 4 shows two full cycles of operation, with 0° taken arbitrarily as a position of rest. At about 5°, the punch pins 10 and 16 begin to operate and this punching operation is over at about 250°, at which time, the feed pawl 28 starts to move because the cam follower 36 is entering the low dwell of cam 30. The feed pawl operation is illustrated in Fig. 4 by a line which starts rising at 250° and reaches a peak at 295°, at which time the feed pawl starts its restore resting at 340°. Since tape movement check contacts 66 will not close until detent pawl 56 has moved a certain distance up the high dwell of ratchet 54, the contacts 66 will be closed during the time approximately between 260° and 285°. Nothing which effects the operation of this device happens between 340° and 5°, at which time the punching starts again. To produce the timing pulses at the proper times in the cycle, the rotating shaft 32 (Fig. 1) has affixed thereto three cams CB1, CB2 and CB3. The contacts of these cams make and break at the times indicated in the drawings.

Returning to Fig. 3, the contacts for CB1 make at 250°. The closing of tape movement check contacts 66 at 260° energizes a forward feed pick relay R-1P by completing a circuit from the +D.C. line 76 through the now closed contacts 66, relay R-1P to the —D.C. line 78. When the tape movement contacts 66 close, a forward feed relay R-1P is energized and its contacts R-1-1 close. This then completes a circuit to energize the forward feed hold relay R1H from the +D.C. line 76 through the closed CB1 contacts, the now closed contacts R-1-1 and the forward feed hold relay R-1H to the —D.C. line 78. This holding circuit then will allow relay R-1H to remain energized until the CB1 contacts break at 50° of the next cycle, and a test before 50° to determine if the relay R-1 is energized will indicate whether the tape movement check contacts 66 have closed.

Figure 5:
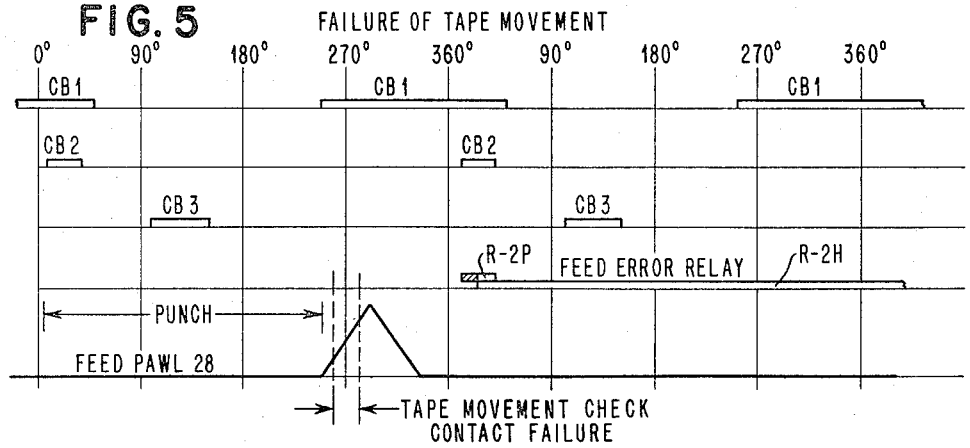
Fig. 5 is a timing chart showing the operation of the cams and contacts of Fig. 1 when there is a failure of tape movement.

The cam contacts CB2 which close between 10° and 40° are then utilized to test if relay R-1H is energized. The forward feed relay contacts R-1-2 are normally closed and are in a circuit from the +D.C. line 76 through the CB2 contacts, the normally closed contacts R-1-2, a feed error relay R-2P to the —D.C. line 78. If the contacts 66 failed to close the energize the forward feed relay R-1H, the contacts R-1-2 will not open, and when the CB2 contact makes at 10° of the next cycle, the feed error relay R-2P will be energized (see Fig. 5). This will cause the feed error relay contacts R-2-1 and R-2-2 to close. The closing of the contacts R-2-1 will cause the feed error hold relay R-2H to be energized by a circuit from the +D.C. line 76 through a reset switch 80, the now closed relay contacts R-2-1 and the feed error hold relay R-2H to the —D.C. line 78. At the same time, a circuit is completed from the +D.C. line 76 through the reset switch 80 and the contacts R-2-2, an error light 82 in parallel with the stop magnet 41, to the —D.C. line 78. Energizing the stop magnet 41 will stop further rotation of the feed wheel 20. The error light 82 will remain on until the circuit is disconnected by the opening of the reset switch 80 which breaks the circuit that contains the feed error hold relay R-2H and opens the contacts R-2-2 to turn off the error light 82.

If relay R-1P is energized by the closing of contacts 66, at the time when CB2 contacts closed at 10°, contacts R-1-2 are open, and feed error relay R-2 will not become energized (see Fig. 4).

As previously described, to insure that the tape movement check contacts 66 are not stuck in the closed position, a test is made at a time in the cycle when the contacts should be open. This test is made by the CB3 contacts which make at 100°. If the tape movement check contacts 66 have failed to open, the relay R-1P will still be energized and the contacts R-1-3 will be closed. A circuit will then be completed, to indicate an error, from the +D.C. line 76 via the closed CB3 contacts, closed R-1-3 contacts, the feed error relay R-2P, to the —D.C. line 78.

If the tape movement check contacts 66 do open, they deenergize relay R-1P. At 50° of the next cycle, when CB1 contacts open, relay R-1H opens, and contacts R-1-3 will open. Then when CB3 contacts close at 100°, the feed error relay R-2P will not be energized, and the operation will continue normally.

In review, the feed error relay R-2P will not be energized if the tape is moving, because when the CB2 contacts are closed between 10° and 40°, the forward feed relay contacts R-1-2 should be open, and when the CB3 contacts are closed between 100° and 150°, the forward feed relay contacts R-1-3 should be open.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claim.

What is claimed is:

In a web movement detection device, means operable to intermittently move the web a predetermined distance, roller means in contact with said web and adapted to be rotated by the web at each web movement, a hub on said roller, a ratchet axially aligned with said roller and having alternate high and low dwells, a hub on said ratchet, a first spring the ends of which surround said hubs in a manner so that each rotation of said roller tightens the first spring around said hubs to rotate the ratchet, a pair of electrical contacts, cam means, a second spring for urging said cam means against a dwell of the ratchet, each rotation of the roller effecting a rotation of the ratchet to cause said cam means to ride from a low dwell over a high dwell, the amount of rotation of the ratchet being less than the amount needed to carry the cam to the next low dwell, said first spring adapted to loosen when said second spring means urges the cam to the next low dwell so as not to transmit any further motion to the roller, means for indicating each operation of said web moving means, and circuit means including said contacts for indicating failure of said contacts to be actuated for each indicated web movement.

References Cited in the file of this patent
UNITED STATES PATENTS 2,142,880     Anderson et al.  ----------  Jan. 3, 1939